(12) United States Patent
Bendahan

(10) Patent No.: US 12,253,648 B2
(45) Date of Patent: Mar. 18, 2025

(54) HIGH-ENERGY X-RAY IMAGING SYSTEM

(71) Applicant: SMITHS DETECTION INC., Edgewood, MD (US)

(72) Inventor: Joseph Bendahan, San Jose, CA (US)

(73) Assignee: Smiths Detection Inc., Edgewood, MD (US)

( * ) Notice: Subject to any disclaimer, the term of this patent is extended or adjusted under 35 U.S.C. 154(b) by 354 days.

(21) Appl. No.: 17/625,627

(22) PCT Filed: Jul. 9, 2020

(86) PCT No.: PCT/US2020/041424
§ 371 (c)(1),
(2) Date: Jan. 7, 2022

(87) PCT Pub. No.: WO2021/007445
PCT Pub. Date: Jan. 14, 2021

(65) Prior Publication Data
US 2022/0260745 A1    Aug. 18, 2022

Related U.S. Application Data

(60) Provisional application No. 62/871,943, filed on Jul. 9, 2019.

(51) Int. Cl.
*G01V 5/226*    (2024.01)
*G01N 23/046*    (2018.01)
(Continued)

(52) U.S. Cl.
CPC ........... *G01V 5/226* (2024.01); *G01N 23/046* (2013.01); *G01N 23/083* (2013.01); *G01N 23/10* (2013.01);
(Continued)

(58) Field of Classification Search
None
See application file for complete search history.

(56) References Cited

U.S. PATENT DOCUMENTS 5,524,133 A * 6/1996 Neale ................... G01V 5/224
378/53
6,130,929 A 10/2000 Saha
(Continued)

FOREIGN PATENT DOCUMENTS

| CN | 102422178 A | 4/2012 |
|---|---|---|
| JP | H-11169470 A | 6/1999 |
| WO | 2014182685 A1 | 11/2014 |

OTHER PUBLICATIONS

International Search Report and Written Opinion for International Patent Application No. PCT/US2020/041424, mailed Jul. 9, 2020, 14 pages.
(Continued)

*Primary Examiner* — Marcus H Taningco
*Assistant Examiner* — Djura Malevic
(74) *Attorney, Agent, or Firm* — Armstrong Teasdale LLP

(57) ABSTRACT

Described herein is a high-energy x-ray imaging system including a stationary gantry, a conveyor assembly configured to convey an object to be imaged through the gantry, a plurality of linear accelerators, a detector array, and a control system. The linear accelerators are arranged in an array within the gantry and are configured to generate high-energy x-ray fan beams to be transmitted through the object. The detector array is positioned opposite the linear accelerators and is configured to collect the high-energy x-ray fan beams transmitted through the object. The control system is configured to energize the linear accelerators according to a predetermined control sequence to generate the high-energy x-ray fan beams, and construct a 3-D image of the object
(Continued)

based on data received from the detector array and representative of the high-energy x-ray fan beams transmitted through the object.

12 Claims, 5 Drawing Sheets

(51) Int. Cl.
  *G01N 23/083* (2018.01)
  *G01N 23/10* (2018.01)
(52) U.S. Cl.
  CPC ............ *G01N 2223/204* (2013.01); *G01N 2223/3307* (2013.01); *G01N 2223/3308* (2013.01)

(56) References Cited

U.S. PATENT DOCUMENTS

| | | | |
|---|---|---|---|
| 7,233,644 B1 | 6/2007 | Bendahan et al. | |
| 7,369,640 B2 | 5/2008 | Seppi et al. | |
| 7,492,862 B2 | 2/2009 | Bendahan | |
| 7,660,391 B2* | 2/2010 | Oreper | A61B 6/032 378/138 |
| 7,706,499 B2* | 4/2010 | Pack | A61B 6/027 378/10 |
| 7,835,486 B2* | 11/2010 | Basu | A61B 6/027 378/10 |
| 7,876,879 B2 | 1/2011 | Morton | |
| 7,899,156 B2* | 3/2011 | Oreper | A61N 5/1049 378/65 |
| 8,509,380 B2* | 8/2013 | Pelc | A61B 6/5205 378/9 |
| 8,848,864 B2* | 9/2014 | Jeong | G01N 23/046 378/22 |
| 8,885,794 B2* | 11/2014 | Morton | G21K 1/025 378/57 |
| 9,048,061 B2* | 6/2015 | Morton | G01V 5/00 |
| 9,069,092 B2* | 6/2015 | Oreper | G01T 1/2985 |
| 9,086,497 B2* | 7/2015 | Bendahan | G01V 5/22 |
| 9,420,677 B2* | 8/2016 | Morton | H01J 1/16 |
| 9,442,213 B2* | 9/2016 | Bendahan | G01V 5/226 |
| 9,746,579 B2* | 8/2017 | Zhang | G06T 11/005 |
| 9,778,391 B2* | 10/2017 | Chen | H05H 9/00 |
| 9,786,041 B2* | 10/2017 | Chen | G06T 7/0002 |
| 10,010,296 B2* | 7/2018 | Basu | G01V 5/226 |
| 10,295,483 B2* | 5/2019 | Morton | G01T 1/2985 |
| 10,517,545 B2* | 12/2019 | Zhang | A61B 6/035 |
| 2009/0067575 A1* | 3/2009 | Seppi | G01V 5/226 378/57 |
| 2011/0058646 A1 | 3/2011 | Herranz et al. | |
| 2011/0206179 A1* | 8/2011 | Bendahan | G01V 5/22 378/19 |
| 2014/0321588 A1* | 10/2014 | Gozani | G01T 3/00 376/154 |
| 2015/0014526 A1* | 1/2015 | Bendahan | G01T 3/00 250/442.11 |
| 2019/0137651 A1 | 5/2019 | Bendahan | |
| 2020/0000423 A1* | 1/2020 | Mohammadi | H01J 35/13 |

OTHER PUBLICATIONS

European Extended Search Report, Application No. 20836920.7, dated Jul. 7, 2023, 43 pps.

\* cited by examiner

HIGH-ENERGY X-RAY IMAGING SYSTEM

CROSS-REFERENCE TO RELATED APPLICATIONS

This patent application is the U.S. National Stage Entry of International Patent Application No. PCT/US2020/041424, filed Jul. 9, 2020, which claims the benefit of priority to U.S. Provisional Patent Application No. 62/871,943, filed Jul. 9, 2019, the disclosures of which are hereby incorporated by reference herein in their entirety as part of the present application.

BACKGROUND

The embodiments described herein relate generally to x-ray imaging systems, and more particularly, to high-energy x-ray imaging systems including a stationary gantry having a plurality of linear accelerator (linac) x-ray sources.

It is well known to use x-rays to image objects and construct two- or three-dimensional images of the interior of an object. For example, computed tomography (CT) can be used to develop a high-quality three-dimensional image of the contents of baggage without physically opening the baggage, such as in airport security screening.

In one x-ray imaging approach, a fan of x-rays is projected from a source point through the object onto a detector array. Each beam within the fan propagates through the object along a different trajectory in a scan plane, and the detector element that collects that beam therefore collects information about the object along the trajectory. This process is repeated for many different source points, generating multiple views of the object. The views are then combined using various reconstruction techniques, such as filtered back projection, to produce a three-dimensional image of the object. Most reconstruction algorithms require that each point to be reconstructed be traversed by x-rays propagating along a plurality of different angles.

In some cases, a gantry containing an x-ray source is rotated about a stationary object to acquire multiple views of the object. However, the gantry is relatively large and is therefore limited to some maximum rotational frequency, which impacts throughput. The rotational frequency can be reduced by acquiring several views simultaneously using multiple detector arrays. However, this requires multiplying the number of detectors that are used, which adds cost and complexity to the system.

In other cases, a stationary x-ray target encompasses the object. An electron beam is scanned across part of or the entire x-ray target. One scan of the electron beam across the entire x-ray target generates a full or partial set of views. The electron beam scanning is faster than mechanical rotation of a gantry, but many known electron beam assemblies are quite large and must be kept under vacuum. That is, some CT systems are expensive, complex, and inappropriately sized for many applications.

There is a need to scan certain objects, such as air cargo, for security reasons (e.g., to detect dangerous materials or objects and/or contraband). Some air cargo is shipped individually or in small boxes and can be scanned with conventional x-ray scanners or CT systems. However, some cargo is consolidated on pallets, on skids, or in air cargo containers. Although these skids can be scanned with conventional x-ray pallet scanners, some contain multiple small parcels or boxes from multiple vendors and with different contents, such that resulting images are difficult to analyze or contain insufficient information.

Accordingly, there is a need for an imaging system that operates at higher energies suitable for penetrating dense container contents and for generating high-resolution 3-D "CT-like" images. It would be desirable for such a system to be cost effective, to have a high throughput suitable for high-traffic air cargo use, and to be appropriately sized (e.g., large enough to accommodate air cargo pallets and small enough for use in a typical scanning environment, such as airport cargo processing facilities).

BRIEF SUMMARY

In one aspect, a high-energy x-ray imaging system is provided. The high-energy x-ray imaging system includes a stationary gantry, a conveyor assembly configured to convey an object to be imaged through the gantry, a plurality of linear accelerators arranged in an array within the gantry, and a detector array positioned opposite the array of linear accelerators. The plurality of linear accelerators are configured to generate a respective plurality of high-energy x-ray fan beams to be transmitted through the object, and the detector array is configured to collect the plurality of high-energy x-ray fan beams transmitted through the object. The high-energy x-ray imaging system also includes a control system configured to energize the plurality of linear accelerators according to a predetermined control sequence to generate the respective plurality of high-energy x-ray fan beams, and reconstruct a 3-D image of the object based on data received from the detector array and representative of the received plurality of high-energy x-ray fan beams transmitted through the object.

In another aspect, a high-energy x-ray imaging system is provided. The high-energy x-ray imaging system includes a stationary gantry, a conveyor assembly configured to convey an object to be imaged through the gantry, and a plurality of linear accelerators arranged in an array within the gantry and configured to generate a respective plurality of high-energy electron beams. The high-energy x-ray imaging system also includes a respective electron beam steering element coupled to each linear accelerator of the plurality of linear accelerators, and a respective extended tungsten target proximate to and associated with each linear accelerator of the plurality of linear accelerators. Each extended tungsten target is configured to generate a high-energy x-ray fan beam upon impingement of a respective electron beam thereon. The high-energy x-ray imaging system further includes a detector array positioned opposite the array of linear accelerators and configured to collect the plurality of high-energy x-ray fan beams transmitted through the object, a rotation platform configured to rotate the object about a vertical rotation axis, and a control system. The control system is configured to energize the plurality of linear accelerators and steer each generated electron beam to a respective extended tungsten target according to a predetermined control sequence to generate a respective first plurality of high-energy x-ray fan beams. The control system is also configured to control the conveyor to the transport of the object through the gantry, control the rotation platform to rotate the object at a selected rotation angle, re-energize the plurality of linear accelerators and steer each generated electron beam to the respective extended tungsten target according to a predetermined control sequence to generate a respective second plurality of high-energy x-ray fan beams, and reconstruct a 3-D image of the object based on data received from the detector array and representative of the received first and second plurality of high-energy x-ray fan beams transmitted through the object.

In a further aspect, a high-energy x-ray imaging system is provided. The high-energy x-ray imaging system includes a stationary gantry, and a conveyor assembly configured to convey an object to be imaged through the gantry. The high-energy x-ray imaging system also includes a first plurality of linear accelerators arranged in a first arcuate array within the gantry, the first arcuate array spanning a first arc within a first plane, the first array of linear accelerators configured to generate a first respective plurality of high-energy x-ray fan beams to be transmitted through the object, and a second plurality of linear accelerators arranged in a second arcuate array spanning a second arc in a second plane parallel to the first plane, the second array of linear accelerators configured to generate a second respective plurality of high-energy x-ray fan beams to be transmitted through the object. The high-energy x-ray imaging system further includes a first detector array positioned opposite the first array of linear accelerators and positioned within the first plane, the first detector array configured to collect the first plurality of high-energy x-ray fan beams transmitted through the object, a second detector array positioned opposite the second array of linear accelerators and positioned within the second plane, the second detector array configured to collect the second plurality of high-energy x-ray fan beams transmitted through the object, and a control system. the control system is configured to energize the first and second arrays of linear accelerators according to a predetermined control sequence to generate the respective first and second plurality of high-energy x-ray fan beams, and reconstruct a 3-D image of the object based on data received from the first and second detector array and representative of the received first and second plurality of high-energy x-ray fan beams transmitted through the object.

In yet another aspect, a high-energy imaging system is provided. The system includes a stationary gantry, a conveyor assembly configured to convey an object to be imaged through the gantry, a plurality of sources arranged in an array within the gantry and configured to generate a respective plurality of fan beams to be transmitted through the object, a detector array positioned opposite the array of sources and configured to collect the plurality of fan beams transmitted through the object, and a control system. The control system is configured to energize the plurality of sources according to a predetermined control sequence to generate the respective plurality of fan beams, and reconstruct a 3-D image of the object based on data received from the detector array and representative of the received plurality of fan beams transmitted through the object.

DETAILED DESCRIPTION

The present disclosure is directed to an x-ray imaging system implemented using linear accelerators (linacs) or other x-ray sources to produce high-energy x-rays suitable for scanning high-density objects (e.g., palletized containers) at a high throughput. The high-energy x-ray imaging systems disclosed herein facilitate obtaining high quality three-dimensional (3-D) density images (and, optionally atomic number images) to enable improved review of the contents of high-density objects. Accordingly, improved detection of contraband and/or other materials or objects of interest is enabled.

Figure 1:
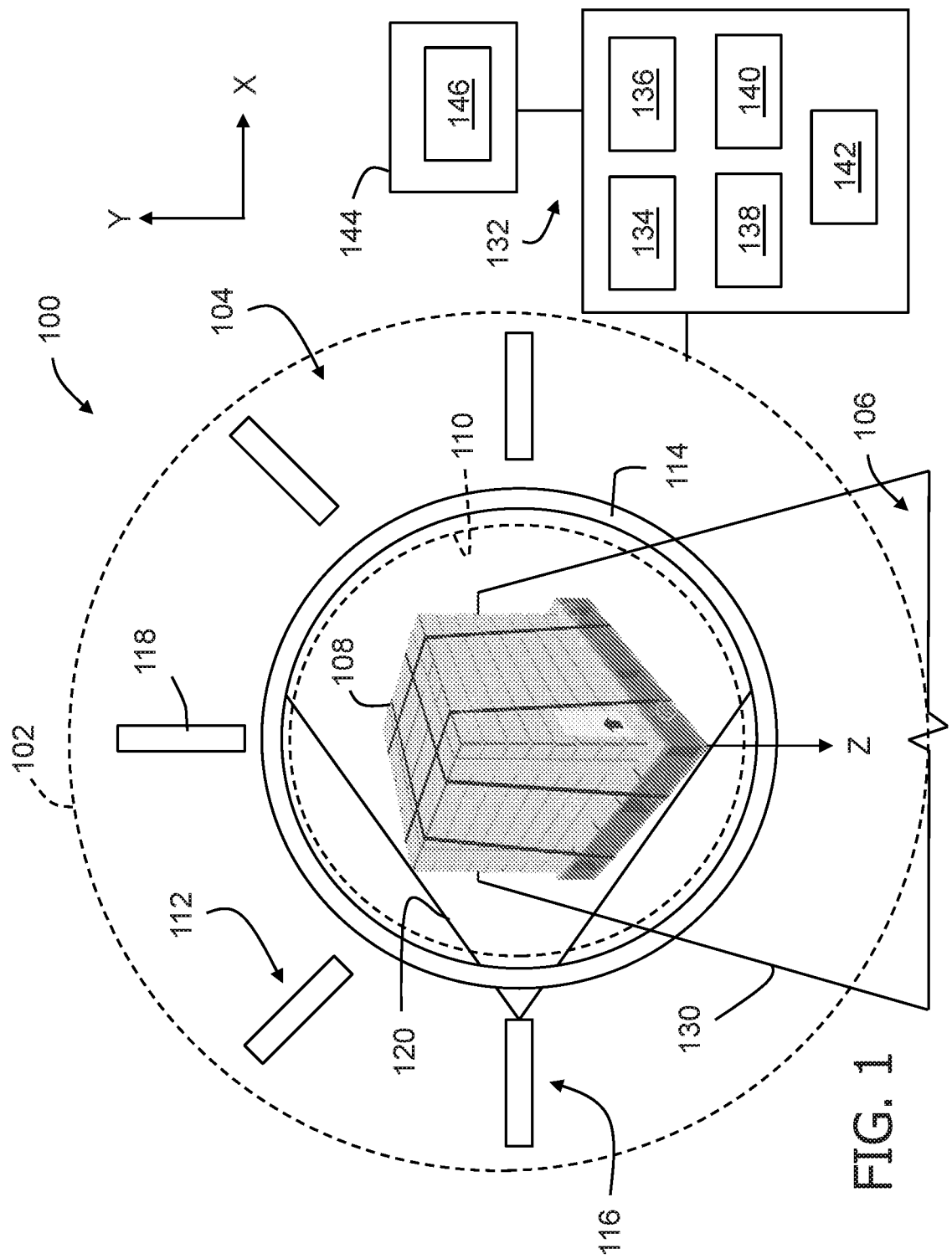
FIG. 1 is a schematic view of one example embodiment of a high-energy x-ray imaging system in accordance with the present disclosure.

Turning now to the figures, FIG. 1 illustrates one example embodiment of a high-energy x-ray imaging system 100 in accordance with the present disclosure. High-energy x-ray imaging system 100 includes a large-diameter gantry 102, an imaging assembly 104, and a conveyor assembly 106. Conveyor assembly 106 is configured to convey an object 108, such as a pallet or skid with containers arranged thereon, through gantry 102 to be imaged by imaging assembly 104. As used herein, "large diameter gantry" refers generally to a gantry having a thru-bore 110 suitable for receiving relatively large objects 108 to be imaged. As such, a large diameter gantry may refer to a gantry with a thru-bore of between about 1.5 meters (m) and about 4 m.

Gantry 102 is illustrated in phantom to clearly depict the components of imaging assembly 104. Specifically, imaging assembly 104 includes a plurality of high-energy x-ray sources 112 and a detector array 114 arranged within gantry 102. X-rays are generated by high-energy x-ray source 112 and collected at detector array 114 to image object 108. Detector array 114 is formed by individual detector elements (not specifically shown), which are radiation detectors that each produce a signal having a magnitude that represents and is dependent on the intensity of the attenuated x-ray beam after it has passed through the object being imaged.

In the example embodiment, high-energy x-ray source 112 includes an array 116 of linear accelerators (linacs) 118. In particular, array 116 includes a plurality of linacs 118, such as four to eight linacs 118. Linacs 118 are configured to generate x-rays with high energies on the order of mega-electron volts (MeV). The particular energy of x-rays generated by linacs 118 is selected based on the size and density of the object 108 to be inspected, and may range from about 1 MeV to about 10 MeV. In addition, as the energy of the x-rays increases, imaging system 100 may include additional shielding (not shown). In some embodiments, other types of sources (other than linacs 118) may be used. For example, neutron sources may be used in some embodiments.

Linacs 118 may be single-energy or dual-energy linacs. For example, where linacs 118 are operated to generate x-rays at energies above about 5 MeV, linacs 118 can be controlled to generate fan beams of x-rays having two energies separated by at least 2 MeV (e.g., fan beams of 4 MeV and 6 MeV). Such operation is referred as an "interlaced mode" and may be implemented to obtain an atomic number of the material(s) of and/or within object 108. At energies of 1 MeV and below, a dual-energy detector may be used. Further, an atomic-number image may also be generated using energy-sensitive detectors.

Typically, the low- and high-energy pulses are emitted at fixed time intervals. This may result in suboptimal atomic-number processing, because the energies fall at different parts of the object as it moves through the gantry. For high frequency linacs, the low- and high-energy pulses are emitted with the minimum time interval possible to minimize this motion effect.

In the example embodiment, linacs 118 are relatively compact, such that the overall size of imaging system 100 may be reduced as compared to known x-ray imaging systems that employ larger-scale linacs. For example, linacs 118 may have a length of about 20 centimeters (cm) to about 60 cm. Using compact linacs results in a smaller system that requires less shielding. However, those of skill in the art will appreciate that the systems and methods described herein may also be implemented using larger (i.e., non-compact) linacs.

In the illustrated embodiment of FIG. 1, each linac 118 generates a single fan beam 120 of x-rays collected at detector array 114 and representative of a single view of object 108. Accordingly, with five linacs 118, five views of object 108 can be obtained. In the illustrated embodiment of FIG. 2, a respective electron-beam steering element 122 is coupled to each linac 118, and imaging assembly 104 further includes a plurality of extended tungsten targets 124, each target 124 adjacent to a respective linac 118. Each steering element 122 is operable to selectively transport an electron beam generated at the respective linac 118 between three positions 126 at the corresponding target 124. As a result of this arrangement, each linac 118 is configured to generate three distinct fan beams 120 of x-rays, such that three views of object 108 can be obtained per linac 118. That is, with the same five linacs 118 shown in FIG. 1, in the embodiment of FIG. 2, fifteen views of object 108 can be obtained. It should be readily understood that a linac 118 can generate any number of views—such as between three and nine views, in certain embodiments—depending on the particular arrangement and selection of electron-beam steering element 122 and/or target 124. Further, a different number of linacs 118 may be used to selectively increase or decrease the number of views.

Figure 3:
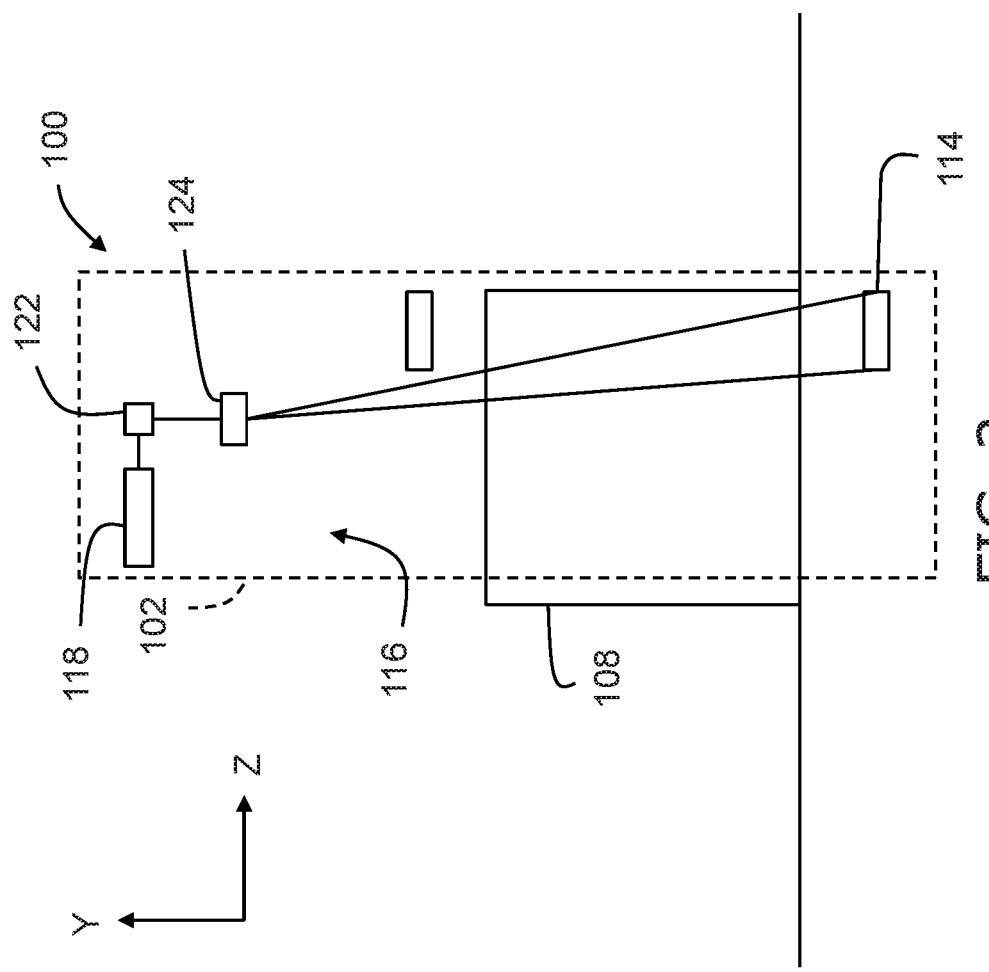
FIG. 3 is a side schematic view of the high-energy x-ray imaging system shown in FIG. 1 or FIG. 2.

As shown in FIG. 3, which illustrates a side view of imaging system 100, linacs 118 may be oriented parallel to the Z-direction, which reduces the overall height of gantry 102 and imaging system 100. As such, this arrangement facilitates less complex and reduced shielding. When linacs 118 are oriented parallel to the Z-direction, steering elements 122 are located downstream (in the Z-direction) from linacs 122, and steer the electron beam inwardly at an approximately 90° angle to targets 124. Such a steering arrangement may be more efficient and/or less complex.

Generally, x-ray imaging systems that capture multiple views of an imaged object are referred to as "multi-view" imaging systems, and the quality of resulting 3-D image increases with the number of views that are captured. In particular, as the quality of the 3-D imaging increases (e.g., as the number of x-ray sources and/or the number of views generated by each source increases), a multi-view imaging system may be considered a computed tomography (CT) imaging system. The present disclosure is directed to high-quality multi-view x-ray systems. In some embodiments, such multi-view x-ray systems may be considered CT imaging systems, when sufficient views are produced. However, the cost and complexity of imaging systems also increases as the image quality is increased, due to the increase in x-ray sources and/or the number of views generated by each source. Accordingly, the particular number of views—which may determine the number of linacs 118 in imaging assembly 104 and/or the number of views generated by each linac 118—can be selected to balance image quality and cost.

In the example embodiment, detector array 114 includes any suitable number of detector elements to collect all x-rays generated by linacs 118. In one embodiment, the detector elements are arranged in a multi-row array 114 and are high energy detectors specifically configured for collecting high-energy x-rays. The particular arrangement of the detector elements within detector array 114, such as a pitch and depth of the detector elements, can be selected for the particular energy of the x-rays and the desired resolution of the image to be obtained. Further, in some embodiments, detector array 114 may include energy sensitive detectors.

Conveyor assembly 106 includes a conveyor belt 130. Object 108 is placed on conveyor belt 130 and transported through gantry 102 to be imaged by imaging assembly 104. In some embodiments, objects 108 are transported on conveyor belt 130 at a speed between about 0.1 meters per second (m/sec) and about 0.3 m/sec. Alternatively, conveyor belt 130 may move objects at any suitable speed. Object 108 is moved through gantry 102 in a Z-direction perpendicular to an X-Y imaging plane defined by imaging assembly 104.

Imaging assembly 104 and conveyor assembly 106 are controlled by a control system 132, which includes a conveyor controller 134, a linac controller 136, a data acquisition system (DAS) 138, an image reconstructor 140, a mass storage system 142, an operator console 144, and a display device 146. Linac controller 136 provides power and timing signals to linacs 118, as described further herein, and DAS 138 acquires analog data from detector array 114 and converts the data to digital form for subsequent processing. Image reconstructor 140 receives the digitized x-ray data from DAS 138 and performs preprocessing steps on the digitized x-ray data and an image reconstruction process, such that 3-D images of the interior of the object (e.g., the interior density of the object and/or atomic number images) may be displayed on display device 146 for review by an operator (not shown).

In the example embodiment, gantry 102 is a stationary gantry. Rather than rotating gantry 102 or object 108 to capture x-ray data for the entire object 108, control system 132 operates linacs 118 according to a predefined control sequence to produce a "virtual rotation" of x-ray beams about object 108. Specifically, linac controller 136 selectively energizes individual linacs 118 in array 116 one at a time to generate an x-ray fan beam 120, which is collected at detector array 114. In one embodiment, linacs 118 are energized in a specific (e.g., non-sequential) order that facilitates producing a 3-D image with higher image quality. For example, the leftmost or "first" linac 118 in array 116 is energized, then the "third" linac 118 in array 116 is energized, then the "seventh" linac 118 in array 116, then the "second" linac 118 in array 116, and so forth. This is merely an example, and those of skill in the art will appreciate that any suitable sequence may be used. Linacs 118 may be energized or powered using one or more power sources/power supplies. The cost of linacs 118 may be reduced by distributing the power from a single RF source.

In the example embodiment, linac controller 136 is configured to energize linacs 118 according to a "virtual rotational frequency" between about 50 rotations per minute (rpm) and about 2000 rpm, where a "rotation" is defined by a full sequence of all linacs 118 in array 116 being energized one or more times. The particular virtual rotational frequency may be defined and/or selected based on the number of linacs 118, the speed of object 108 being conveyed through gantry 102, the desired energy of the x-rays, the desired image quality, and/or other factors.

Figure 2:
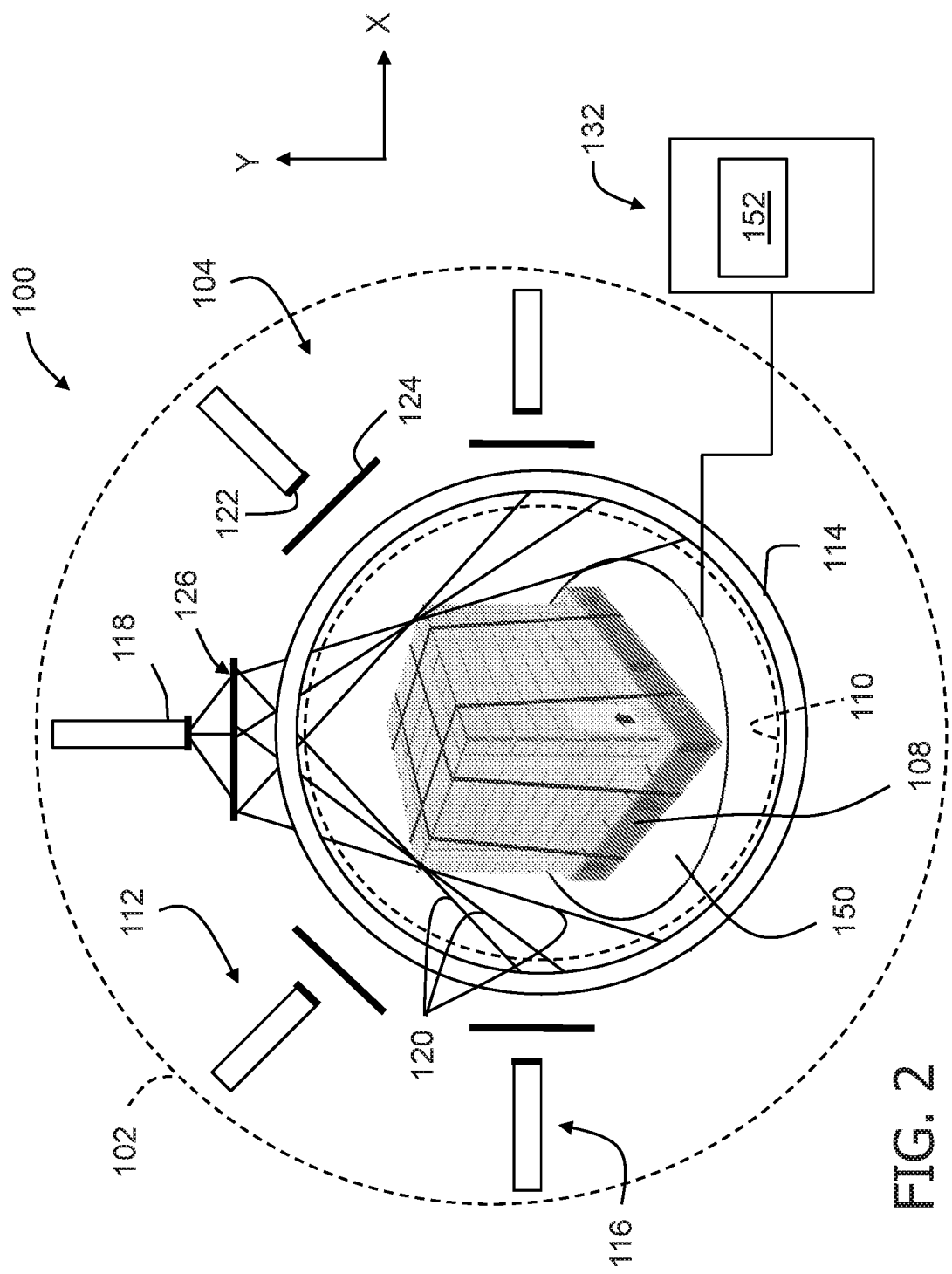
FIG. 2 is another schematic view of a high-energy x-ray imaging system in accordance with the present disclosure.

In some embodiments, such as the embodiment shown in FIG. 2, conveyor assembly 106 includes a rotatable platform 150 positioned within thru-bore 110 of gantry 102. For example, a conveyor belt (e.g., conveyor belt 130, not shown in FIG. 2) may transfer object 108 to gantry 102 where object 108 is conveyed or otherwise transferred onto rotatable platform 150. Once object 108 has been imaged by imaging assembly 104, rotatable platform 150 is rotated to thereby rotate object 108 about a rotation axis (not shown) defined parallel to the Y-direction. Object 108 is imaged again to obtain a new set of views of object 108. This process may be iterated any number of times, depending on, for example, the desired number of views, the angle of rotation of rotatable platform 150, and other factors.

Rotatable platform 150 is controlled by control system 132, which may include a platform controller 152. Platform controller 152 provides control signals to rotatable platform 150 that define the angle of rotation of rotatable platform 150, or the angle about which rotatable platform 150 rotates (e.g., 45°, 90°, etc.). Such embodiments increase the number of views of object 108 to be imaged (and therefore increases the resulting 3-D image quality), but may reduce the throughput of imaging system 100, as each object 108 takes more time to be imaged.

In some embodiments of the present disclosure, imaging assembly 104 includes hundreds of linacs 118, such that hundreds of views of object 108 are generated. Notably, such embodiments may be expensive and/or complex to control. In other embodiments, as described above, a reduced number of compact linacs 118 is used, and electron beam steering elements 122 direct the electron beam to a plurality of locations on an x-ray producing (e.g., tungsten) target 124 to generate a plurality of views to reconstruct a 3-D image. In still other embodiments, a reduced number of compact linacs 118 is used, and object 108 is rotated to generate more views to reconstruct the 3-D image. Any aspect of any embodiment described herein may be used in combination. Specifically, the present disclosure is directed to balancing cost, complexity, throughput, and image quality (e.g., generating "CT-like" high-quality 3-D images) according to the particular application or use of imaging system 100.

Turning to FIG. 3, a side view of imaging system 100 is shown. With reference to FIGS. 1-3, imaging system 100 includes linacs 118 arranged over about 180° of an X-Y plane of object 108 to be imaged (e.g., an imaging plane). As a result of such an arrangement, linac array 116 and detector array 114 are positioned in different planes, or are offset from one another in the Z-direction. Otherwise, detector array 114 would interfere with the x-ray fan beams 120 from the linacs 118, which results in a non-optimal quality 3-D image. In some embodiments, linacs 118 can be arranged over more or less than 180° of the imaging plane, including up to 360° or an entire circumference of the imaging plane. In such embodiments, detector array 114 may likewise be arranged to collect the x-ray fan beams 120 over up to 360° of the entire circumference of the imaging plans. Positioning linac array 116 and detector array 114 in offset planes, however, introduces added complexity in interpreting the attenuated x-ray data to form the 3-D image, which may increase the computing and processing requirements and costs of imaging system 100.

Figure 4:
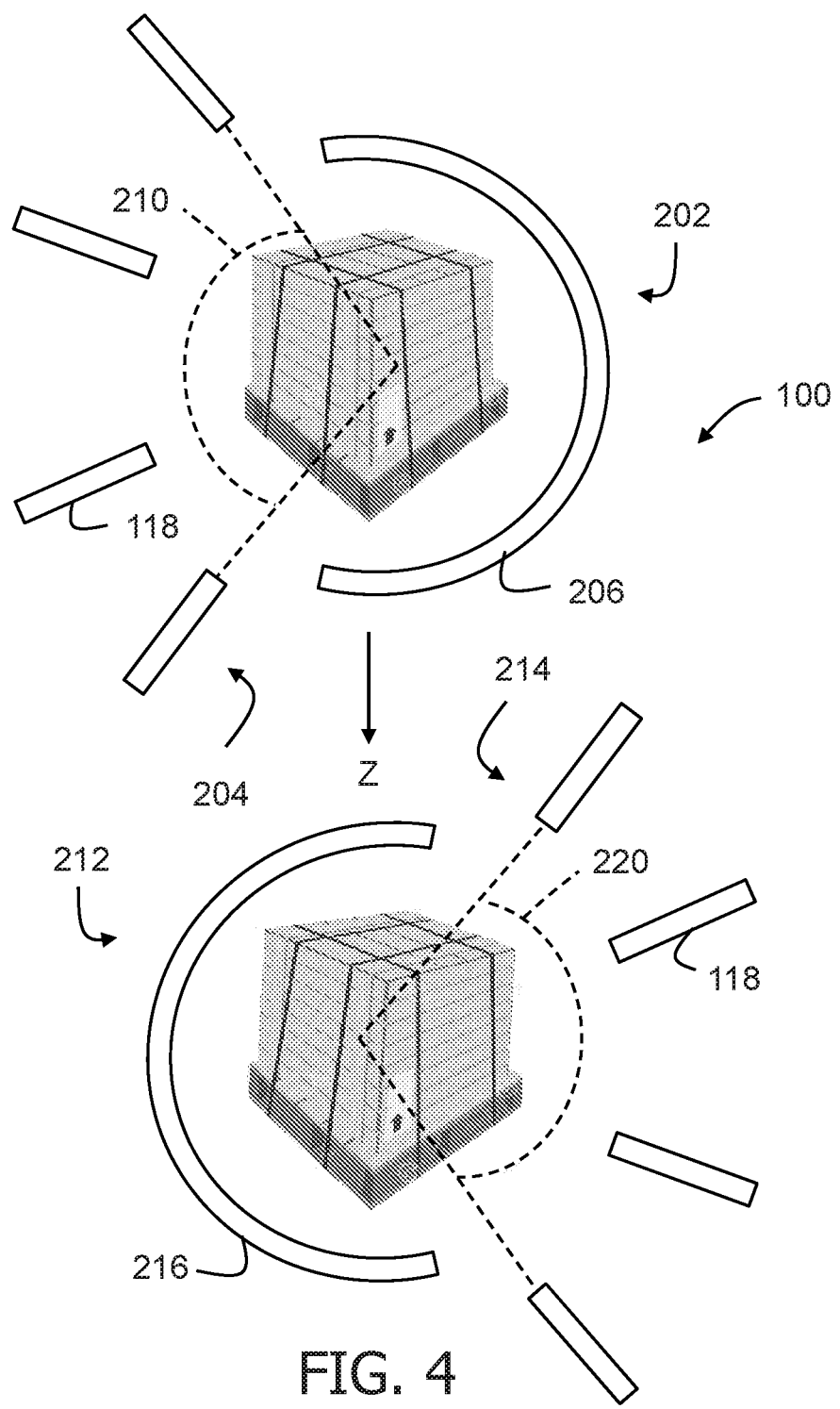
FIG. 4 is a schematic view of an alternative embodiment of the high-energy x-ray imaging system shown in FIG. 1.
Figure 5:
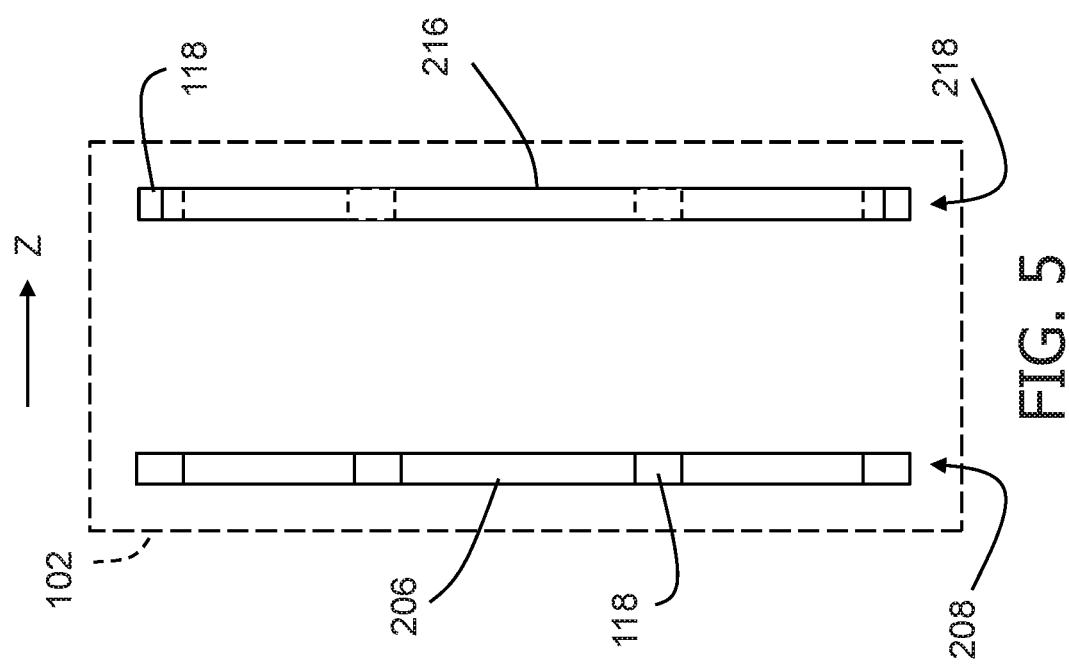
FIG. 5 is a side schematic view of the high-energy x-ray imaging system shown in FIG. 4.

An alternative embodiment of imaging system 100 is illustrated in FIGS. 4 and 5. Specifically, FIG. 4 depicts an expanded schematic view of imaging system 100, and FIG. 5 depicts a side view of imaging system 100. In this embodiment, the array of linacs and the detector array are divided and separated into two discrete planes spaced apart from one another along the Z-direction.

Specifically, a first imaging subassembly 202 includes a first array 204 of linacs 118 and a first detector array 206 positioned within a first plane 208 (see FIG. 5). First array 204 of linacs 118 includes two to four linacs 118 extending along a first arc 210 of up to 180° about object 108 to be imaged, such as between about 90° and about 150°. First detector array 206 is positioned opposite first array 204 of linacs 118.

A second imaging subassembly includes 212 a second array 214 of linacs 118 and a second detector array 216 positioned within a second plane 218 (see FIG. 5) spaced from and downstream of first plane 208 in the z-direction. Second array 214 of linacs 118 includes two to four linacs 118 extending along a second arc 220 of up to about 180° about object 108 to be imaged, such as between about 90° and about 150°. Second arc 220 is a mirror image of first arc 220 across a Y-Z plane bisecting gantry 102, such that substantially all of object 108 is imaged by the combination of first and second arrays 204, 214 of linacs 118. Second detector array 216 is positioned opposite second array 214 of linacs 118.

This arrangement enables imaging object 108 with about the same number of linacs 118 as the embodiment of FIGS. 1 and 2, enabling having the source and detectors on the same plan to obtain the 3-D images of object 108. In the illustrated embodiment, first and second imaging subassemblies 202, 212 are arranged within the same gantry 102. In such embodiments, first and second imaging subassemblies 202, 212 are configured to image object 108 substantially simultaneously. Specifically, object 108 need not be actively translated from first imaging subassembly 202 to second imaging subassembly 212 to be imaged. First and second planes 208, 218 may be separated by about 40 centimeters (cm) to about 60 cm, such as by about 50 cm. Alternatively, first and second planes 208, 218 may be separated by any suitable distance. Moreover, although the embodiment of FIGS. 4 and 5 illustrates linacs 118 in arranged in two planes, in other embodiments, linacs 118 may be arranged in any number of planes.

Although the embodiments disclosed herein refer to linacs as x-ray sources, it should be readily understood that different radiation sources, such as neutron sources (e.g., a deuteron accelerator) are used instead of linear-electron accelerators. In such embodiments, the deuteron beam is steered to hit neutron production targets, such as deuterium or tritium, to produce a plurality of neutron fan beams and generate a resulting 3-D image based on neutron transmission.

Exemplary embodiments of methods and systems for imaging objects, particularly dense and/or complex objects, are described above in detail. The methods and systems are not limited to the specific embodiments described herein, but rather, components of systems and/or steps of the methods may be used independently and separately from other components and/or steps described herein. Accordingly, the exemplary embodiment can be implemented and used in connection with many other applications not specifically described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A high-energy x-ray imaging system comprising:
a stationary gantry;
a conveyor assembly configured to convey an object to be imaged through said gantry;
a first plurality of linear accelerators arranged in a first arcuate array within said gantry, the first arcuate array spanning a first arc within a first plane, said first array of linear accelerators configured to generate a first respective plurality of high-energy x-ray fan beams to be transmitted through the object;
a second plurality of linear accelerators arranged in a second arcuate array spanning a second arc in a second plane parallel to the first plane, said second array of linear accelerators configured to generate a second respective plurality of high-energy x-ray fan beams to be transmitted through the object;
a first detector array positioned opposite said first array of linear accelerators and positioned within the first plane, said first detector array configured to collect the first plurality of high-energy x-ray fan beams transmitted through the object;
a second detector array positioned opposite said second array of linear accelerators and positioned within the second plane, said second detector array configured to collect the second plurality of high-energy x-ray fan beams transmitted through the object; and
a control system configured to:
energize said first and second arrays of linear accelerators according to a predetermined control sequence to generate the respective first and second plurality of high-energy x-ray fan beams; and
reconstruct a 3-D image of the object based on data received from said first and second detector array and representative of the received first and second plurality of high-energy x-ray fan beams transmitted through the object.

2. The high-energy x-ray imaging system of claim 1, wherein each linear accelerator of said first and second arrays of linear accelerators comprises an electron beam steering element coupled thereto, and said high-energy x-ray imaging system further comprises a plurality of extended tungsten targets, each extended tungsten target positioned adjacent to a respective linear accelerator, and wherein each said electron beam steering element is configured to selectively transport an electron beam of said respective linear accelerator to one of a plurality of locations at said respective extended tungsten target such that each linear accelerator is configured to generate a corresponding plurality of high-energy x-ray fan beams.

3. The high-energy x-ray imaging system of claim 1, wherein said conveyor assembly includes a rotation platform configured to rotate the object about a vertical rotation axis to generate additional views of the object.

4. The high-energy x-ray imaging system of claim 3, wherein said control system is further configured to control a rotational speed of said rotation platform.

5. The high-energy x-ray imaging system of claim 1, wherein each linear accelerator of said first and second arrays of linear accelerators is configured to generate more than one high-energy x-ray fan beam.

6. The high-energy x-ray imaging system of claim 1, wherein said detector array comprises an energy-sensitive detector.

7. The high-energy x-ray imaging system of claim 1, wherein the first plane is separated from the second plane by up to 60 centimeters (cm).

8. The high-energy x-ray imaging system of claim 1, wherein, according to the predetermined control sequence, each linear accelerator of said first array of linear accelerators is individually energized and each linear accelerator of said second array of linear accelerators is individually energized to produce a virtual rotation of the first and second plurality of x-ray beams about the object.

9. The high-energy x-ray imaging system of claim 1, wherein said system is configured to rotate the object after an initial scan and rescan the object at least one time to produce additional views.

10. The high-energy x-ray imaging system of claim 1, wherein said control system is further configured to control said conveyor assembly to convey the object through said gantry at a speed of about 0.1 meters per second (m/sec) to about 0.3 m/sec.

11. The high-energy x-ray imaging system of claim 1, wherein, according to the predetermined control sequence, said first and second arrays of linear accelerators are energized individually in temporal sequence.

12. The high-energy x-ray imaging system of claim 1, wherein, according to the predetermined control sequence, said first and second arrays of linear accelerators are energized individually in a non-sequential order relative to a physical arrangement of said first and second arrays of linear accelerators.

* * * * *